United States Patent
Gonzales et al.

(10) Patent No.: US 11,043,720 B2
(45) Date of Patent: Jun. 22, 2021

(54) MESH BUSBAR AND ELECTRICAL COUPLING METHOD USING SAME

(71) Applicant: Ford Global Technologies, LLC, Dearborn, MI (US)

(72) Inventors: Philip Michael Gonzales, Dearborn, MI (US); John Sturza, Royal Oak, MI (US); Dylan Erb, Allen Park, MI (US); Stephanie Singer, Berkley, MI (US); Abdul Lateef, Canton, MI (US); Chuck Honick, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 272 days.

(21) Appl. No.: 16/220,777

(22) Filed: Dec. 14, 2018

(65) Prior Publication Data

US 2020/0194766 A1  Jun. 18, 2020

(51) Int. Cl.
*H01M 50/502* (2021.01)
*H01R 9/16* (2006.01)
*H01M 50/505* (2021.01)
*H02G 5/10* (2006.01)
*H01M 50/543* (2021.01)
*H01R 43/02* (2006.01)

(52) U.S. Cl.
CPC ....... *H01M 50/502* (2021.01); *H01M 50/543* (2021.01); *H01R 9/16* (2013.01); *H02G 5/10* (2013.01); *H01M 2220/20* (2013.01); *H01R 43/02* (2013.01)

(58) Field of Classification Search
None
See application file for complete search history.

(56) References Cited

U.S. PATENT DOCUMENTS

| | | | |
|---|---|---|---|
| 4,323,726 A | 4/1982 | Criss et al. | |
| 7,667,432 B2* | 2/2010 | West | B60L 58/18 320/112 |
| 9,853,435 B1 | 12/2017 | Burkman | |
| 2015/0035496 A1 | 2/2015 | Kikuchi | |
| 2018/0026250 A1 | 1/2018 | Mattmuller et al. | |
| 2018/0219309 A1* | 8/2018 | Okazaki | H01M 50/502 |
| 2019/0006832 A1* | 1/2019 | Ritosa | H02G 3/04 |
| 2019/0189994 A1* | 6/2019 | Narayanan | H01M 50/502 |

(Continued)

FOREIGN PATENT DOCUMENTS

| | | |
|---|---|---|
| CN | 104810636 | 7/2015 |
| CN | 105490119 | 4/2016 |
| JP | 2015041532 | 3/2015 |

(Continued)

OTHER PUBLICATIONS

Erico Catalog, pp. 24-25, Metallic Braids, www.lowcostcontrols.com (www.eirco.com) "Erico" (no date).*

(Continued)

*Primary Examiner* — Tracy M Dove
(74) *Attorney, Agent, or Firm* — David Kelley, Esq.; Carlson, Gaskey & Olds, P.C.

(57) ABSTRACT

A busbar assembly includes a mesh busbar configured to electrically couple a first component to a second component. An electrical coupling method including securing a mesh busbar to a first component and a second component to electrical couple the first component to the second component.

17 Claims, 4 Drawing Sheets

(56) References Cited

U.S. PATENT DOCUMENTS

2019/0372070 A1* 12/2019 Jeon .................... H01M 50/572
2020/0067418 A1*  2/2020 Daneels ................. H01G 2/106

FOREIGN PATENT DOCUMENTS

KR      1020170117764         10/2017
KR        20180011630 A  *     2/2018

OTHER PUBLICATIONS

Flexible Conductors (https://www.erico.com/catalog/literature/P1300C-USEN.pdf), pp. 35-49, 2003 "Flexible Conductors".*

* cited by examiner

MESH BUSBAR AND ELECTRICAL COUPLING METHOD USING SAME

TECHNICAL FIELD

This disclosure relates generally to a busbar and, more particularly, to a mesh busbar. The mesh busbar can be used to electrical couple components of an electrified vehicle, for example.

BACKGROUND

Electrified vehicles differ from conventional motor vehicles because electrified vehicles are selectively driven using one or more electric machines powered by a battery pack. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

A battery pack of an electrified vehicle can include a plurality of battery cell assemblies arranged in one or more battery arrays. Busbars can be used to distribute power to and from the battery cell assemblies, and to and from the battery pack. Some busbars are flexible busbars that include multiple individual layers stacked on top of one another.

SUMMARY

A busbar assembly, according to an exemplary aspect of the present disclosure includes, among other things, a mesh busbar configured to electrically couple a first component to a second component.

In another non-limiting embodiment of the foregoing assembly, the mesh busbar includes a first mesh area configured to directly connect to the first component, and a second mesh area configured to directly connect to the second component.

In another non-limiting embodiment of any of the foregoing assemblies, the mesh busbar includes a bend relative to a longitudinal axis of the mesh busbar such that the mesh busbar extends non-linearly from the first mesh area to the second mesh area.

In another non-limiting embodiment of any of the foregoing assemblies, the mesh busbar includes a plurality of openings, and further comprising a fastener that extends through at least one of the openings to directly connect the mesh area to the first component.

In another non-limiting embodiment of any of the foregoing assemblies, the opening that receives the fastener is rounded, and the other openings of the mesh area are rectangular.

In another non-limiting embodiment of any of the foregoing assemblies, the mesh busbar includes a first mesh layer folded over a second mesh layer.

In another non-limiting embodiment of any of the foregoing assemblies, the mesh busbar includes a third mesh layer folded over the second mesh layer.

Another non-limiting embodiment of any of the foregoing assemblies includes a fastener extending through an opening in the first mesh layer and through an opening in the second mesh layer. The fastener secures the mesh busbar to the first component.

In another non-limiting embodiment of any of the foregoing assemblies, the mesh busbar includes a plurality of individual strands woven in an over-and-under pattern.

Another non-limiting embodiment of any of the foregoing assemblies includes the first component, and the first component is a battery array of a traction battery.

Another non-limiting embodiment of any of the foregoing assemblies includes the first component, and the first component is an electrified vehicle powertrain component.

An electrical coupling method according to another exemplary embodiment includes securing a mesh busbar to a first component and a second component to electrical couple the first component to the second component.

Another non-limiting embodiment of the foregoing method includes communicating fluid through openings to cool the mesh busbar.

Another non-limiting embodiment of any of the foregoing methods includes directly securing a first mesh area of the mesh busbar to the first component, and directly securing a second mesh area of the mesh busbar to the second component.

In another non-limiting embodiment of any of the foregoing methods, the mesh busbar includes a plurality of individual strands woven in an over-and-under pattern.

In another non-limiting embodiment of any of the foregoing methods, the mesh busbar includes a first mesh layer folded over a second mesh layer.

In another non-limiting embodiment of any of the foregoing methods, the mesh busbar includes a third mesh layer folded over the second mesh layer.

Another non-limiting embodiment of any of the foregoing methods includes securing the mesh busbar to the first component with a fastener that extends through both an opening in the first mesh layer and an opening in the second mesh layer.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to a busbar assembly that includes a mesh busbar. The mesh busbar provides openings, which can facilitate an exchange of thermal energy between the busbar assembly and the surrounding environment. The mesh busbar can be flexed and bent into various configurations. The mesh busbar can be used within an electrified vehicle.

Figure 1:
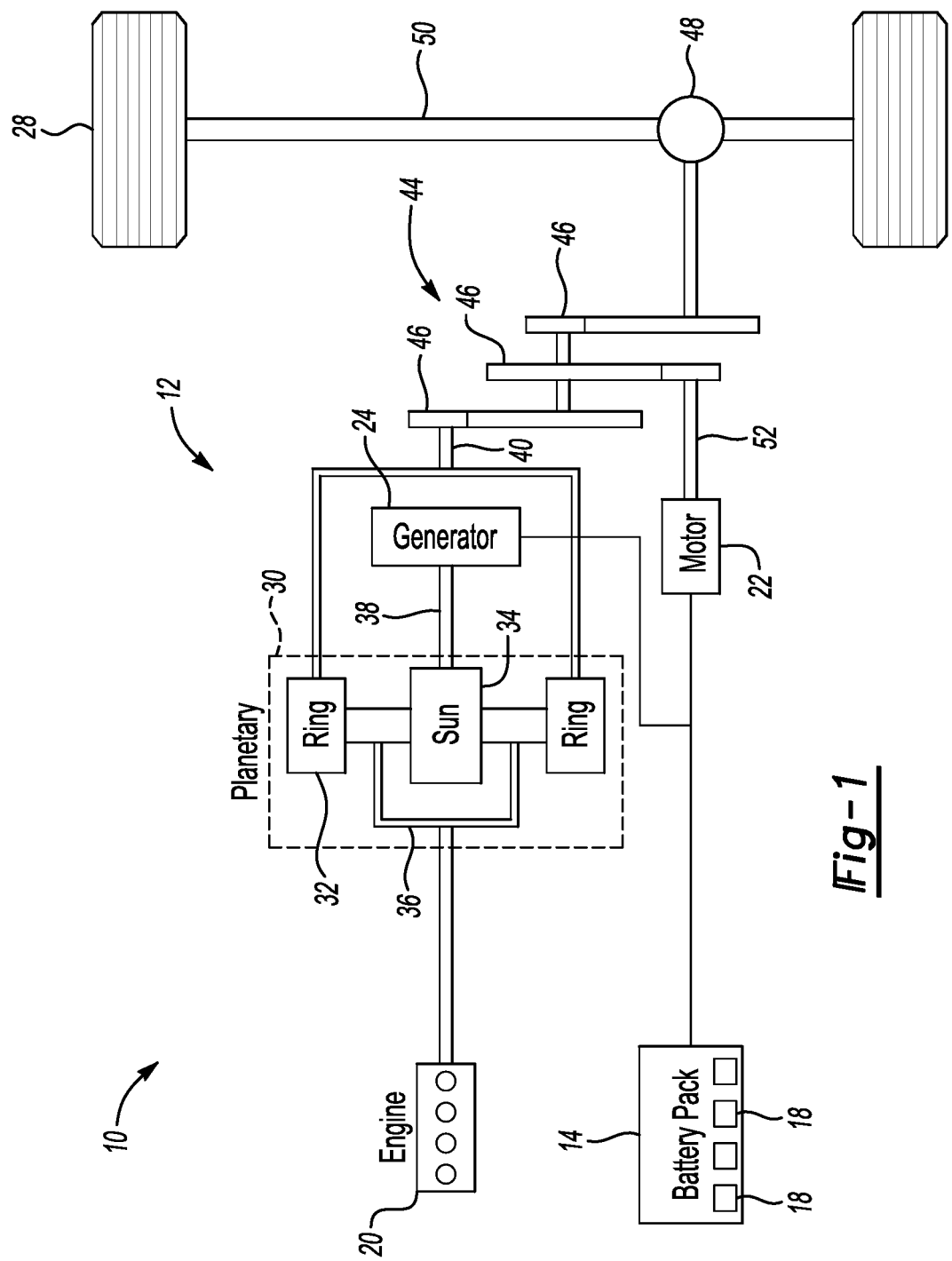
FIG. 1 illustrates a schematic view of an example powertrain of an electrified vehicle.

Referring to FIG. 1, a powertrain 10 of a hybrid electric vehicle (HEV) includes a battery pack 14 having a plurality of battery arrays 18, an internal combustion engine 20, a motor 22, and a generator 24. The motor 22 and the generator 24 are types of electric machines. The motor 22 and generator 24 may be separate or have the form of a combined motor-generator.

In this embodiment, the powertrain 10 is a power-split powertrain that employs a first drive system and a second drive system. The first and second drive systems generate torque to drive one or more sets of vehicle drive wheels 28. The first drive system includes a combination of the engine 20 and the generator 24. The second drive system includes at least the motor 22, the generator 24, and the battery pack 14. The motor 22 and the generator 24 are portions of an electric drive system of the powertrain 10.

The engine 20 and the generator 24 can be connected through a power transfer unit 30, such as a planetary gear set. Of course, other types of power transfer units, including other gear sets and transmissions, can be used to connect the engine 20 to the generator 24. In one non-limiting embodiment, the power transfer unit 30 is a planetary gear set that includes a ring gear 32, a sun gear 34, and a carrier assembly 36.

The generator 24 can be driven by the engine 20 through the power transfer unit 30 to convert kinetic energy to electrical energy. The generator 24 can alternatively function as a motor to convert electrical energy into kinetic energy, thereby outputting torque to a shaft 38 connected to the power transfer unit 30.

The ring gear 32 of the power transfer unit 30 is connected to a shaft 40, which is connected to the vehicle drive wheels 28 through a second power transfer unit 44. The second power transfer unit 44 may include a gear set having a plurality of gears 46. Other power transfer units could be used in other examples.

The gears 46 transfer torque from the engine 20 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 can be selectively employed to drive the vehicle drive wheels 28 by outputting torque to a shaft 54 that is also connected to the second power transfer unit 44. In this embodiment, the motor 22 and the generator 24 cooperate as part of a regenerative braking system in which both the motor 22 and the generator 24 can be employed as motors to output torque. For example, the motor 22 and the generator 24 can each output electrical power to recharge cells of the battery pack 14.

Figure 2:
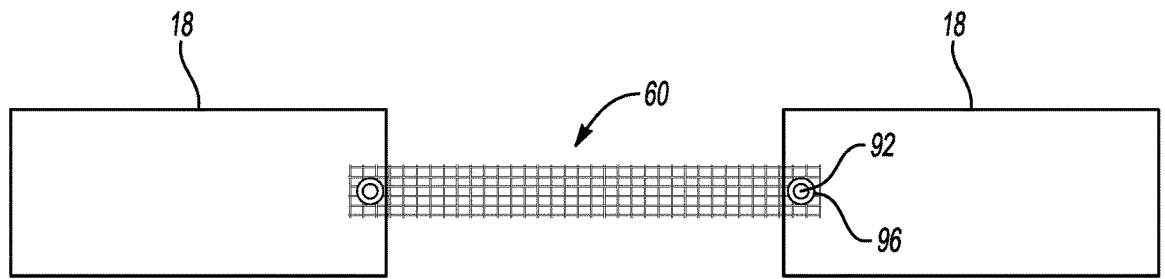
FIG. 2 illustrates a side view of a mesh busbar electrically coupling together two components of the powertrain of FIG. 1.

Referring now to FIG. 2 with continuing reference to FIG. 1, a busbar assembly includes a mesh busbar 60. The mesh busbar 60 can be used to electrically couple one of the arrays 18 of the battery pack 14 to another of the arrays 18 of the battery pack 14. The mesh busbar 60 can connect to terminals of the arrays 18 to electrically couple together the arrays 18.

Figure 3:
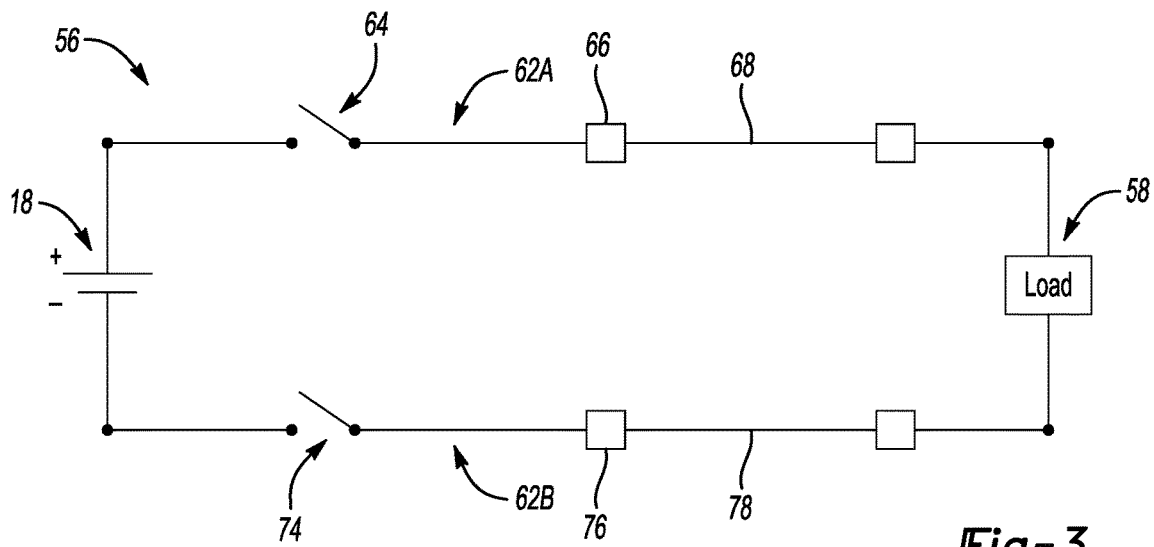
FIG. 3 schematically illustrates an electronic distribution system used in the powertrain of FIG. 1.

The mesh busbar 60 could instead be used to electrically couple together other components. For example, FIG. 3 schematically illustrates an electric distribution system 56 of the powertrain 10. The electric distribution system 56 distributes electrical energy between the battery arrays 18 and a load 58, such as the motor 22.

The mesh busbar 60 could be used at position 62A to electrically couple together a first component 64 and a second component 66. In this example, the first component 64 is a relay, and the second component 66 is a connector, such as a connector to a wiring harness 68. The mesh busbar 60 could be used at position 62B to instead, or additionally, electrically couple together a third component 74 and a fourth component 76. In this example, the third component 74 is a relay, and the fourth component 76 is a connector, such as a connector to a wiring harness 78.

The mesh busbar 60 could be used in other areas of the system 56 to electrically couple together components, such as the wiring harness 68 and the load 58, or the first component 64 and the battery arrays 18. The mesh busbar 60 could also be used elsewhere within the powertrain 10, in another portion of the vehicle incorporating the powertrain 10, or for some other application.

The mesh busbar 60 could also instead used to electrically couple together the terminals of individual battery cells within the arrays 18. For example, the battery cells could be lithium ion battery cells with terminal tabs. At least some of the terminal tabs could be coupled to the mesh busbar 60 to electrically couple together those terminal tabs.

The mesh busbar 60 should thus not be construed as limited to busbars electrically coupling arrays 18 as shown in FIG. 2, or as electrically coupling the structures shown in the system 56 of FIG. 3. The mesh busbar 60 can be used to electrically couple together various components.

Figure 4:
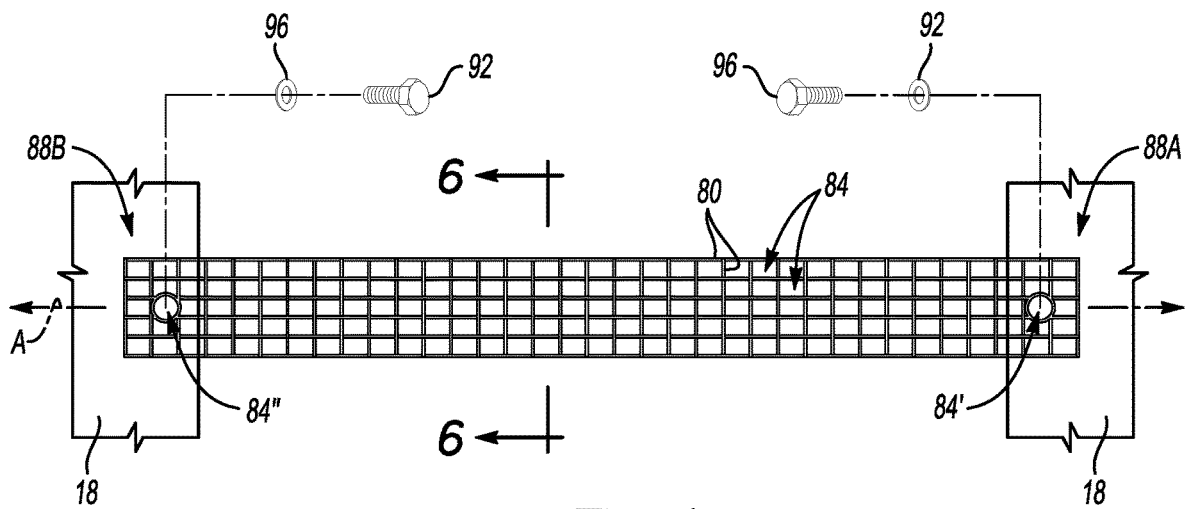
FIG. 4 illustrates a partially expanded, close-up view of the mesh busbar of FIG. 2.
Figure 5:
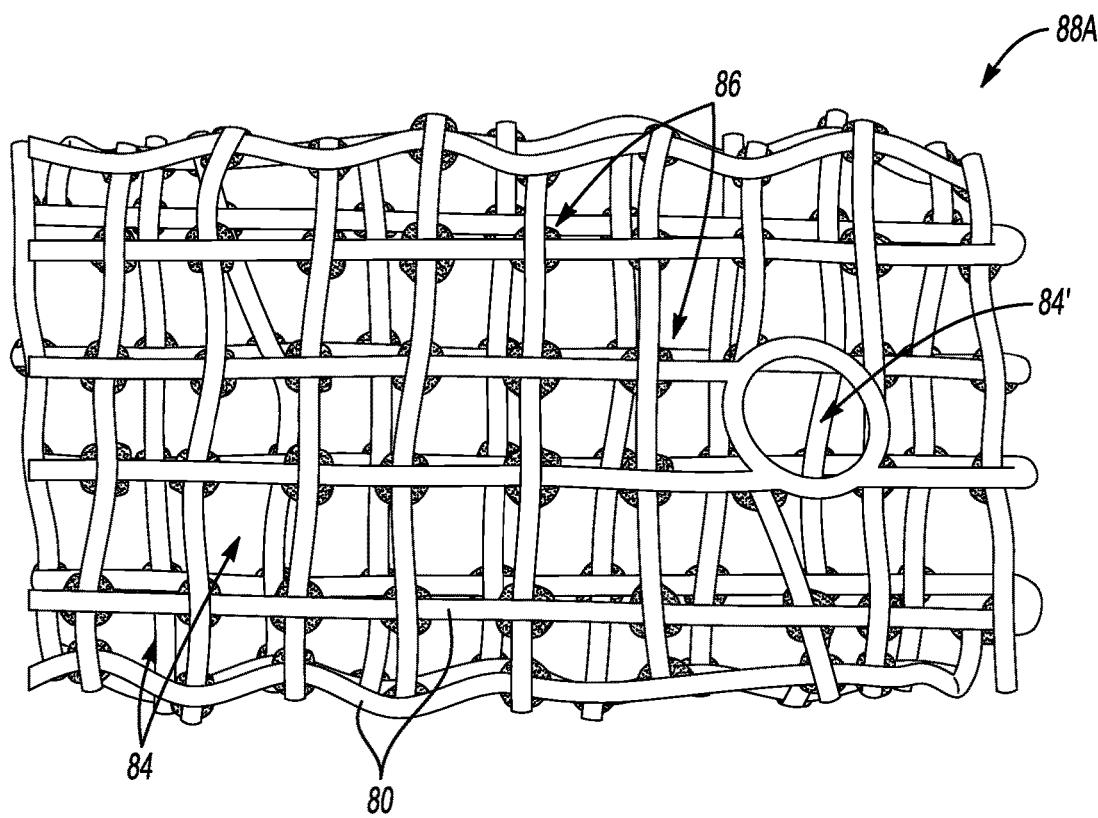
FIG. 5 illustrates a close-up view of a mesh area of the mesh busbar of FIG. 4.
Figure 6:
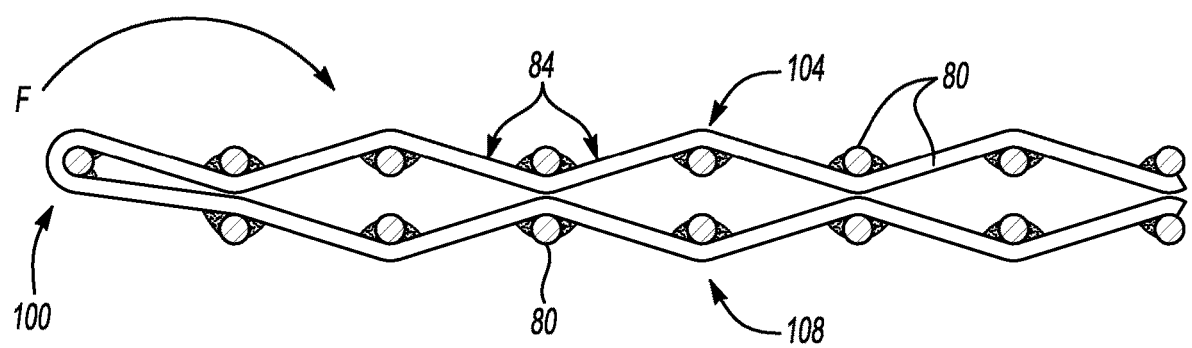
FIG. 6 illustrates a section view taken at line 6-6 in FIG. 4.

Referring to FIGS. 4-6 with continuing reference to FIG. 2, the mesh busbar 60 can be provided by strands 80 of metal or metal alloy wire. The strands 80 are copper in this example. The individual strands 80 can each provide a path for current to flow through the mesh busbar 60.

In the exemplary non-limiting embodiment, the strands 80 are woven in an over-and-under pattern, such as a plain weave. The strands 80 are spaced from each other to provide openings 84. In this example, the strands 80 are spaced such that the openings 84 throughout the majority of the mesh busbar 60 are rectangular. Communicating a flow of a fluid, such as air, through the openings 84 can facilitate cooling of the mesh busbar 60.

Where the strands 80 overlap, such as at areas 86, the strands 80 can be joined together. Joining the strands 80 at the areas 86 can maintain the size of the openings 84 as the mesh busbar 60 is manipulated into an installed position. The strands 80 could be joined together using a soldering or welding process, for example.

In the exemplary non-limiting embodiment, opposite longitudinal end portions 88A, 88B of the mesh busbar 60 are each secured to a respective component, here one of the arrays 18, by a mechanical fastener 92 and a washer 96. The mechanical fasteners 92 can extend through one of the openings 84' and clamp the associated washers 96 against the mesh busbar 60. Electrical energy can communicate between the mesh busbar 60 and the component through the mechanical fasteners 92 and the washers 96. Notably, the mechanical fasteners 92 and washers 96 directly connect mesh areas of the mesh busbar 60 to the respective component. That is, the strands 80 are directly clamped by the mechanical fasteners 92 and washers 96 to the respective component.

The portions of the strands 80 providing the openings 84' are bent in this example such that the openings 84' are rounded rather than rectangular. Rounding the openings 84' can facilitate insertion of the mechanical fasteners 92 into the openings 84'. The shaft of the mechanical fastener 92 has a circular cross-section in this example. Thus, rounding the openings 84' can facilitate contact between the mechanical fasteners 92 and the portions of the strands 80 providing the openings 84'. The openings 84' could be non-rounded in other examples.

Rather than the mechanical fastener 92 extending through the openings 84' to secure the mesh busbar 60, other examples could connect the mesh busbar 60 using a threaded fastener, such as a nut, that is torqued to engaged a stud extending from the component through openings 84'.

Other examples could utilize soldering, welding, or crimping to connect the mesh busbar 60 to components. Other examples could include electrically connecting the mesh busbar 60 to a component without directly connecting the mesh busbar 60 to the component, such as through a wired connection between the mesh busbar 60 and the component. That is, fastening structures other than mechanical fasteners could be used to electrically couple the mesh busbar 60 to components.

The exemplary mesh busbar 60 includes a first fold 100, a first mesh layer 104, and a second mesh layer 108. The first fold 100 extends in a direction aligned with the longitudinal axis A. The first mesh layer 104 rests on top of the second mesh layer 108 in this example.

Constructing the mesh busbar 60 can involve weaving the strands 80 and then joining the strands 80 to provide the first mesh layer 104 and the second mesh layer 108 aligned within a common plane. The first mesh layer 104 is then folded in a direction F to position the first mesh layer 104 atop the second mesh layer 108. The mechanical fasteners 92 each extend through openings 84' in both the first mesh layer 104 and the second mesh layer 108. That is, in the exemplary embodiment, the mechanical fasteners 92 each extend through two openings 84'.

The mesh busbar 60, in another exemplary non-limiting embodiment could include a single mesh layer rather than the two mesh layers 104 and 108. However, using more than one mesh layer within the mesh busbar 60 can provide the mesh busbar 60 more current carrying capacity.

Figure 6A:
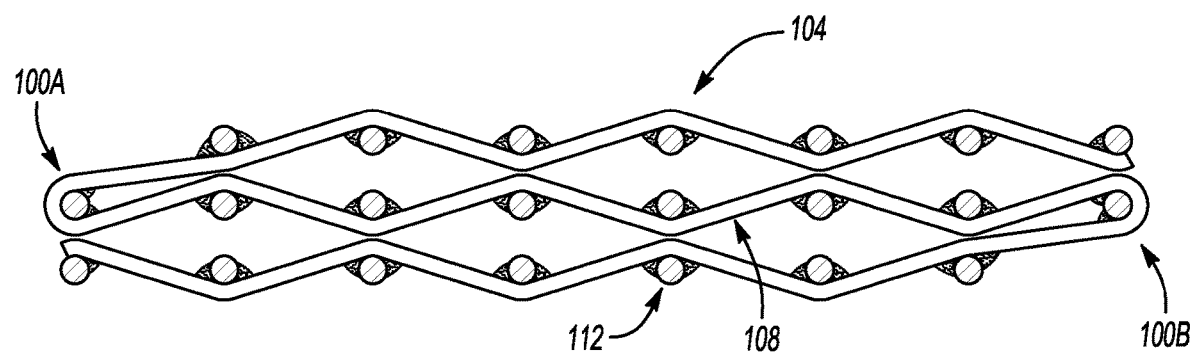
FIG. 6A illustrates a section view of a mesh busbar according to another exemplary embodiment.

For example, referring to FIG. 6A, the mesh busbar 60, in another exemplary non-limiting embodiment, could include a first and a second fold 100A, 100B, the first mesh layer 104, the second mesh layer 108, and a third mesh layer 112. In still other examples, the mesh busbar 60 could include more than three mesh layers. Additional mesh layers can be added depending on current carrying requirements.

The exemplary mesh busbar 60 extends longitudinally along an axis A (FIG. 4) and includes substantially no bends relative to a longitudinal axis of the mesh busbar 60. That is, the exemplary mesh busbar 60 extends substantially linearly from the first end portion 88A to the second end portion 88A.

Figure 7:
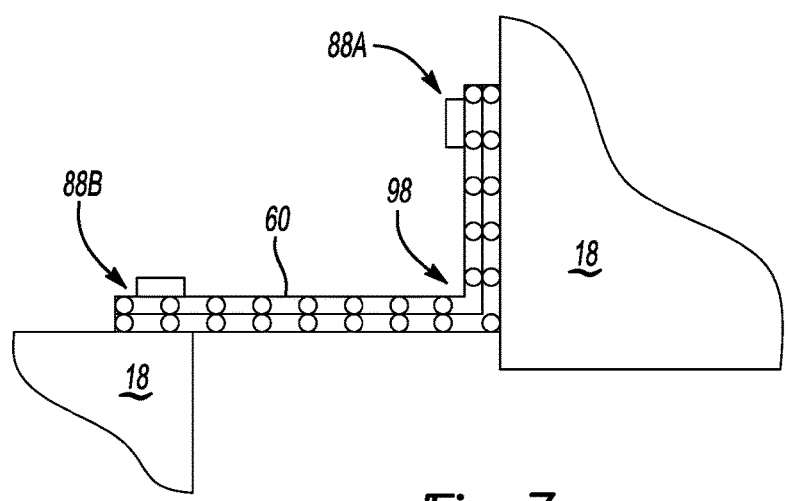
FIG. 7 illustrates the mesh busbar of FIG. 4 bent into a different configuration from that of FIG. 4.

In other examples, the mesh busbar 60 could include one or more bends 98, relative to the longitudinal axis of the mesh busbar 60 as shown in FIG. 7. One or more bends 98 in the mesh busbar 60 can be help to position the first end 88A and the second end 88B in areas appropriate for connecting respective components. One or more bends 98 may be required when the mesh busbar 60 cannot extend linearly between the components that are electrically coupled to the mesh busbar 60. Incorporating one or more bends into the mesh busbar 60 can also help to position the mesh busbar 60 to meet packaging requirements. The one or more bends 98 can reduce the required packaging size, for example.

Features of the disclosed examples include providing busbar made of a mesh structure. Openings in the mesh busbar can enhance thermal energy exchange. The mesh busbar can be lighter weight than solid busbars.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A busbar assembly, comprising:
   a mesh busbar configured to electrically couple a first component to a second component wherein the mesh busbar includes a first mesh layer folded over a second mesh layer, wherein the mesh busbar includes a plurality of openings within a mesh area of the mesh busbar; and
   a mechanical fastener that extends through at least one of the openings to directly connect the mesh area of the mesh busbar directly to the first component.

2. The busbar assembly of claim 1, wherein the mesh busbar includes a first mesh area configured to directly connect to the first component, and a second mesh area configured to directly connect to the second component.

3. The busbar assembly of claim 2, wherein the mesh busbar includes a bend relative to a longitudinal axis of the mesh busbar such that the mesh busbar extends non-linearly from the first mesh area to the second mesh area.

4. The busbar assembly of claim 1, wherein the plurality of openings includes at least one rounded opening and at least one rectangular opening, the at least one rounded opening receiving the mechanical fastener.

5. The busbar assembly of claim 1, wherein the mesh busbar includes a third mesh layer folded over the second mesh layer.

6. The busbar assembly of claim 1, wherein the mesh busbar includes a plurality of individual strands woven in an over-and-under pattern.

7. The busbar assembly of claim 6, further comprising the first component, wherein the first component is a battery array of a traction battery.

8. The busbar assembly of claim 6, further comprising the first component, wherein the first component is an electrified vehicle powertrain component.

9. An electrical coupling method, comprising:
   clamping a first mesh area of a mesh busbar to a first component and clamping a second mesh area of the mesh busbar to a second component to electrically couple the first component to the second component; and
   clamping the first mesh area of the mesh busbar directly to the first component using a first mechanical fastener, and clamping the second mesh area of the mesh busbar directly to the second component using a second mechanical fastener.

10. The method of claim 9, further comprising communicating fluid through openings to cool the mesh busbar.

11. The method of claim 9, wherein the mesh busbar includes a first mesh layer folded over a second mesh layer.

12. The method of claim 11, wherein the mesh busbar includes a plurality of individual strands woven in an over-and-under pattern, wherein at least some of the individual strands extend through both the first layer and the second layer.

13. The method of claim 11, wherein the mesh busbar includes a third mesh layer folded over the second mesh layer.

14. The method of claim 11, further comprising securing the mesh busbar to the first component with a fastener that extends through both an opening in the first mesh layer and an opening in the second mesh layer.

15. The busbar assembly of claim 1, wherein the first mesh layer includes a plurality of individual strands that are folded over to provide part of the second mesh layer.

16. The busbar assembly of claim 15, wherein the plurality of individual strands extend continuously from the first layer to the second layer.

17. A busbar assembly, comprising:
  a first component and a second component;
  a mesh busbar electrically coupling the first component to the second component, the mesh busbar includes a first mesh layer folded over a second mesh layer, the mesh busbar including a plurality of individual strands woven in an over-and-under pattern, at least some of the individual strands extending through both the first layer and the second layer;
  a first mechanical fastener extending through an opening in the first mesh layer and an opening in the second mesh layer to secure a first mesh area of the mesh busbar directly to the first component; and
  a second mechanical fastener extending through an opening in the second mesh layer and an opening in the second mesh layer to secure a second mesh area of the mesh busbar directly to the second component.

* * * * *